May 21, 1968            K. CASTIGLIONE            3,384,081

HAND-GRIP SYRINGE FOR CONTINUOUS INJECTIONS

Filed June 19, 1963            2 Sheets-Sheet 1

3,384,081
HANDGRIP SYRINGE FOR CONTINUOUS
INJECTIONS
Kenneth Castiglione, London, England, assignor to Kenneth Castiglione Limited, London, England, a British company
Filed June 19, 1963, Ser. No. 289,140
Claims priority, application Great Britain, June 25, 1962, 24,409/62
6 Claims. (Cl. 128—218)

ABSTRACT OF THE DISCLOSURE

A syringe has a straight duct connecting an inlet for the liquid to be pumped to an outlet for the liquid. There is a valve at the inlet and another at the outlet. A handle for the syringe extends at right angles to the duct and contains a piston and cylinder arrangement, the cylinder opening into the duct. There is a lever connected to the piston, the lever lying alongside the handle, the arrangement being such that when it is pressed towards the handle, against the force of a spring, it makes the piston move towards the duct and this causes liquid to be expelled from the outlet of the syringe.

The term "syringe" is used in this specification to denote a device for ejecting a predetermined quantity of liquid through an outlet orifice, the device having fitted to it or being constructed to have fitted to it a hypodermic needle for injecting this liquid into a body.

According to the present invention, there is provided a syringe comprising an inlet for the entry of liquid into the syringe, an outlet for the outflow of liquid from the syringe, a straight duct connecting the inlet to the outlet, an inlet valve at one end of the duct for controlling the entry of liquid into the syringe, an outlet valve at the other end of the duct for controlling the outflow of liquid from the syringe, a handle for the syringe extending at right angles to the duct, a member that is wholly within the handle, a chamber in said member which opens into the duct at a location intermediate said inlet valve and said outlet valve and which extends away from the duct at right angles to the duct, a piston mounted in the chamber to slide therein, a piston rod connected to the piston and extending out of said member but lying wholly within said handle, a lever pivoted at a location which is fixed with respect to the handle and having an actuating arm extending alongside said handle, said member, said chamber and said piston, coupling means coupling said lever to said piston rod, for imparting to the piston reciprocatory linear motion in consequence of reciprocatory turning motion of said lever, and spring means for urging the piston to take up a particular position in the chamber.

Figure 1:
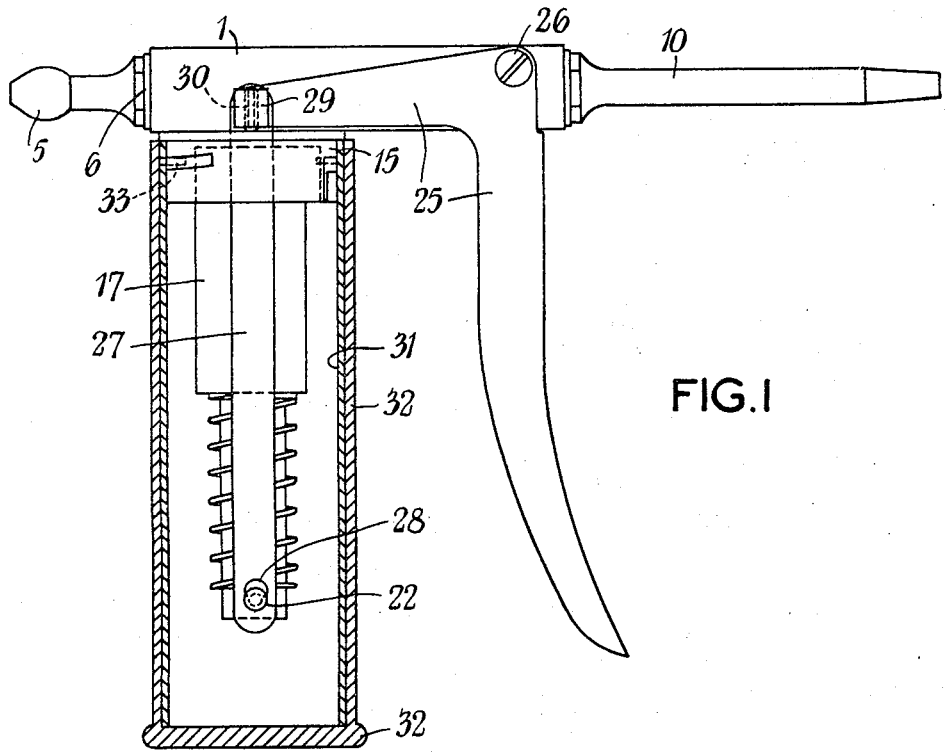
Figure 3:
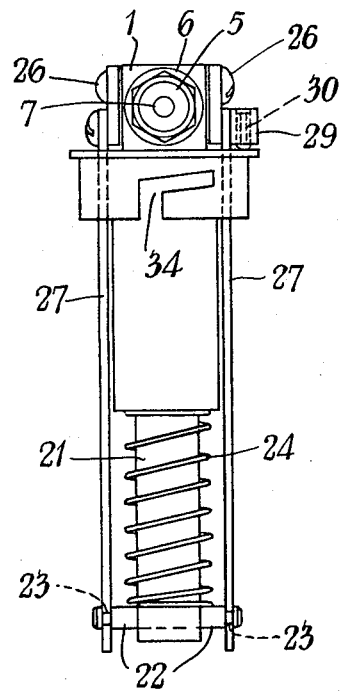
Figure 2:
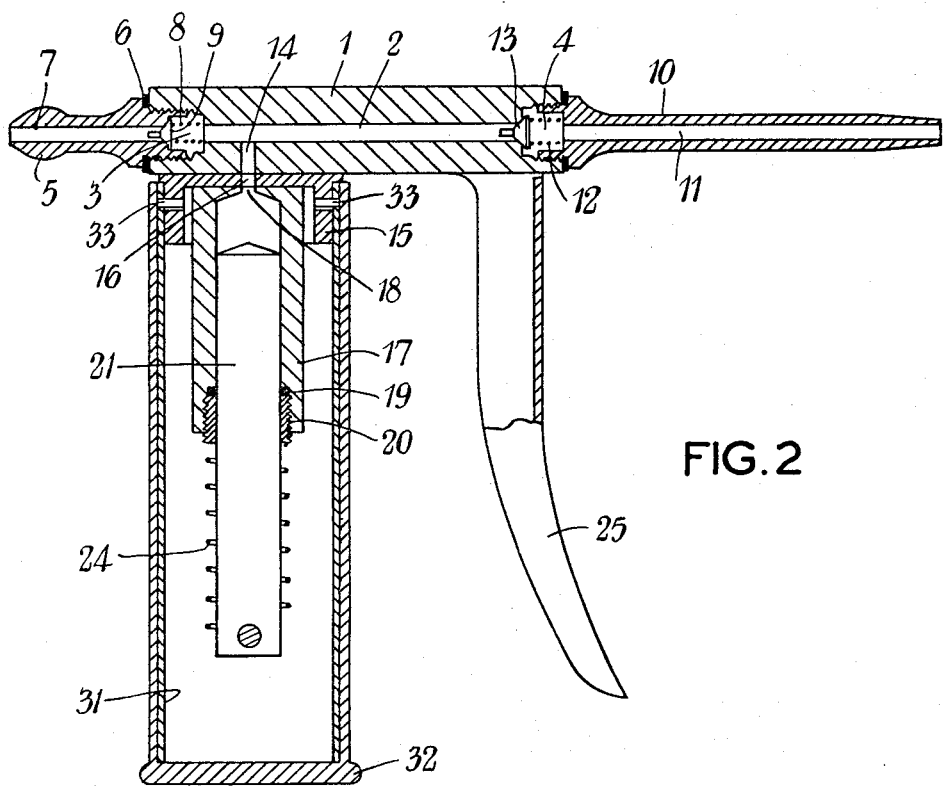

For a better understanding of the present invention and to show how the same may be carried into effect, reference will now be made to the accompanying drawings in which:

FIGURE 1 is an external side view, part of the casing being cut away, of a syringe according to the invention, FIGURE 2 is a cross-section of the syringe looking in the same direction as in FIGURE 1, and FIGURE 3 is a rear view of the syringe with a piece of casing removed.

The syringe shown in the figures is generally T-shaped the leg of the T-shape providing a handle so that the syringe may be held in one hand and used like a gun, and the syringe having a lever which acts as a trigger, the pressing of which causes the discharge from the syringe of a pre-determined quantity of fluid, e.g. a vaccine.

The syringe has a barrel 1 along which extends a straight duct 2 of circular cross-section which opens ou at the ends of the barrel 1 into chambers 3 and 4 (se FIGURE 2) each of which is provided with an interna screw thread at its mouth. Into the chamber 3 an inle member 5 is screwed, there being a washer 6 betweei this member and the barrel 1. The inlet member 5 has : bore 7 through it for connecting the chamber 3 to a tub (not shown) having one end fitted over the inlet membe 5 and the other end connected to a supply of fluid. In th chamber 3 an inlet valve is disposed, the valve comprisin; a spring 8 and a valve member 9 held against the inne end of the bore 7 by the spring, thereby maintaining th valve normally closed. Into the chamber 4 is screwed ai outlet member 10, having a bore 11 therethrough. Th member 10 is constructed in a known manner for th fitting of a hypodermic needle at its right-hand end. Th chamber 4 contains an outlet valve which comprises : spring 12 and a valve member 13 held against the end o the duct 2 by the spring to maintain the valve normall closed. The outer ends of the bores 7 and 11 provide th inlet and outlet orifices of the syringe, these orifices, th duct 2 and the valves lying in a straight line.

The barrel 1 of the syringe is also provided with a bor 14 extending perpendicularly from the duct 2 to the out side of the barrel. The bore 14 provides a connection fron the inlet and outlet valves to a cylinder extending awa from and at right angles to the duct 2, in the handle o the syringe, and this will now be described. Fixed to th barrel 1 is a short annular cylinder 15, more fully de scribed below, which has an aperture 16 through it. / second, longer, cylinder 17 with a bore of circular cross section has its upper, closed, end fixed to the cylinder 15 this upper end having an aperture 18 which is arrange coaxially with the bore 14 and the aperture 16. The lowei open, end of the cylinder 17 is provided with an O-rin seal 19 which can be removed by unscrewing an insert 2 in the end of the cylinder. A piston 21 is disposed in th cylinder 17, the seal 19 providing a pressure-tight fit fo the piston in the cylinder. As can be seen from FIGUR] 1, the piston head, which can be considered as the uppe portion of the piston 21, and the piston rod, which can b considered as the lower portion of the piston 21, are ir tegrally formed and their shapes and sizes of cross-sectio are the same so that the piston head and the piston ro can be pulled out of the end of the cylinder remote fror the duct 2 to permit cleaning thereof. The piston 21 ha two round pin-like projections 22 at its lower end on or posite sides of the piston rod portion, these projection being the ends of a single pin fitted through a hole in th piston rod. Each pin has an annular groove 23. The e> ternal part of the piston rod is surrounded by a helicz spring 24, one end of which acts on the cylinder throug the insert 20 at the end of the cylinder 17 and the othe end of which abuts the projections 22. The piston 21 wi normally be positioned as shown by the action of th spring 24, there being a volume between the piston hea and the upper end of the bore of the cylinder 17. To de crease this volume it is necessary to move the piston 2 upwards against the action of the spring 24. The cylinde 17 is reduced in width at its upper end to form a shoulde which constitutes a metallic stop. The upward travel c the piston 21 is terminated by a metallic part of the pisto head striking said shoulder of the cylinder 17 at the uppe end of its bore.

The piston 21 is moved by pressing a lever which ca be likened to a trigger. The lever which is referenced 2 is divided into two parts on opposite sides of the barrel at its upper end and is pivoted, at a location which is fixe with respect to the handle, about two screws 26 passin through a hole in the elbow of each of said parts respe< tively and screwed into the barrel 1. Each of the hor ontal portions of the lever 25 is pivotally connected at its left-hand end to an arm 27, made from a flat flexible strip, the two arms 27 descending through slits in the top of the cylinder 15 from opposite sides of the barrel 1 as shown in FIGURE 3. Each arm 27 has a slot 28 in its lower end, the bottom of each slot 28 being of an approximately semi-circular shape of slightly smaller diameter than the projections 22 and the upper portion of each slot being of greater diameter than the projections 22 so that a projection 22 can be inserted into each slot 28, the spring 24 forcing the pins towards the bottom of the slots, the rims of which engage in the respective grooves 23. The piston 21 can be quickly removed from the cylinder 7 by pressing the piston into the cylinder against the action of the spring 24 until the pins 22 can be withdrawn through the upper portion of the slots, whereupon the piston is pulled out of the cylinder.

At the top of one arm, that shown in FIGURE 1, a small block 29 is fixed, the block having a threaded bore therethrough. A screw 30 extends through the bore to project from the other side of the block 29 so that the piston 21 will descend until the end of screw 30 abuts the top of the short cylinder 15. The lower limit of travel of the piston can thus be adjusted by turning the screw 30, the other limit of travel being, as aforementioned, the position where the piston head abuts the upper, inner, surface of the cylinder 17.

In order to enable the syringe to be held properly without interfering with its operation, the handle of the syringe is a cylindrical casing 31 covered in rubber 32 and this casing 31 encloses the mechanism in the handle. Two pins 33 inside the casing at the open end are introduced into slots 34 in the cylinder 15. One of the slots is shown in FIGURE 3, the other being on the opposite side of the cylinder 15, so that by a twisting motion, the casing 31 can be fitted to or removed from the syringe. The casing 31 is dimensioned to provide a sliding fit over the outer surface of the cylinder 15.

The syringe is used as follows, it being assumed that the inlet member 5 is connected to a source of fluid and that the barrel 1 and the volume in the cylinder 17 are all of fluid as will be the case after the syringe has been operated a number of times to dispel the air in it and in any connecting tubes. As previously mentioned the outlet member 10 will have a hypodermic needle fitted to it when the syringe is used. Upon pressing the levers 25 towards the handle, the pressure built up in the barrel 1 maintains the inlet valve closed but opens the outlet valve so that one "shot" of fluid is injected into a body into which the hypodermic needle is inserted. Upon releasing the lever 25 so that the pressure lowers, the valve arrangements reverse their condition so that more fluid from the source can enter the barrel 1 and the volume in the cylinder 17. This process is repeated, the piston 21 performing a reciprocatory motion as the lever 25 is pressed and then released, there being one "shot" for each cycle of this motion. Providing that the lever 25 is pressed sufficiently to bring the piston to its upper limit of travel for each "shot," the "shots" of injected fluid will be of equal volume.

A plurality of slots 28 could be provided in each of the arms 27 so that the capacity of a "shot" can be altered simply by inserting the projections 22 into different slots to alter the lower limit of the piston 21 in the cylinder 17.

I claim:

1. A syringe comprising an inlet for the entry of liquid into the syringe, an outlet for the outflow of liquid from the syringe, a straight duct connecting the inlet to the outlet an inlet valve at one end of the duct for controlling the entry of liquid into the syringe, an outlet valve at the other end of the duct for controlling the outflow of liquid from the syringe, a handle for the syringe extending at right angles to the duct, a chamber within the handle which opens into the duct at a location intermediate said inlet valve and said outlet valve and which extends away from the duct at right angles to the duct, a piston mounted in the chamber to slide therein, means for imparting reciprocatory motion to the piston, comprising a piston rod connected to the piston, two projections on opposite sides of the piston rod, a lever pivoted at a location which is fixed with respect to the handle, two arms each pivotally connected to the lever, each arm having portions defining an opening therein and one of the arms being connected to the piston rod by one of said projections being entered in the opening defined by said portions of said one arm and the other arm being connected to the piston rod by the other of said projections being entered in the opening defined by said portions of the said other arm and spring means for urging the piston to take up a particular position in the chamber.

2. A syringe according to claim 1 wherein each of said projections has portions defining a groove therein and wherein said portions defining an opening in each arm comprise first portions defining a first part of the opening which is of greater dimensions than the cross-section of the projection outside said groove for allowing the projection to pass through the opening and second portions defining a second part of the opening which is of smaller dimensions than said cross-section of the projection but of at least equal dimensions to the cross-section of the projection inside the groove for receiving the material of the projection that is within the groove.

3. A syringe comprising an inlet for the entry of liquid into the syringe, an outlet for the outflow of liquid from the syringe, a straight duct connecting the inlet to the outlet, an inlet valve at one end of the duct for controlling the entry of liquid into the syringe, an outlet valve at the other end of the duct for controlling the outflow of liquid from the syringe, a handle for the syringe extending at right angles to the duct, a chamber within the handle which opens into said duct at a location intermediate said inlet valve and said outlet valve and which extends away from the duct at right angles to the duct, a piston mounted in the chamber to slide therein, means for imparting reciprocatory motion to the piston, comprising a piston rod having two projections on opposite sides thereof and being connected to the piston, a lever pivoted at a location which is fixed with respect to the handle, two arms pivotally connected to the lever, each arm having portions defining an opening therein and one of the arms being connected to the piston rod by one of said projections passing through the opening defined by said portions of said one arm and the other arm being connected to the piston rod by the other of said projections passing through the opening defined by said portions of the said other arm, and a spiral spring which surrounds part of the piston rod, one end of the spring abutting against said projections and the other end being at a location fixed with respect to said duct, for urging the piston to take up a particular position in the chamber.

4. A syringe comprising an inlet for the entry of liquid into the syringe, an outlet for the outflow of liquid from the syringe, a straight duct connecting the inlet to the outlet, an inlet valve at one end of the duct for controlling the entry of liquid into the syringe, an outlet valve at the other end of the duct for controlling the outflow of liquid from the syringe, a handle for the syringe extending at right angles to the duct, a member that is wholly within the handle, a chamber in said member which opens into the duct at a location intermediate said inlet valve and said outlet valve and which extends away from the duct at right angles to the duct, a piston mounted in the chamber to slide therein, a piston rod connected to the piston and extending out of said member but lying wholly within said handle, two projections on opposite sides of the piston rod, a lever pivoted at a location which is fixed with respect to the handle and having an actuating arm extending alongside said handle, said member, said chamber and said piston, coupling means coupling said lever to said piston rod, for imparting to the piston reciprocatory linear motion in consequence of reciprocatory turning motion of said lever, and spring means for urging the piston to take up a particular position in the chamber, said coupling means comprising two arms each pivotally connected to the lever, each arm having portions defining an opening therein and one of the arms being connected to the piston rod by one of said projections being entered in the opening defined by said portions of said one arm and the other on being connected to the piston rod by the other of said projections being entered in the opening defined by said portions of the said other arm.

5. A syringe comprising an inlet for the entry of liquid into the syringe, an outlet for the outflow of liquid from the syringe, a straight duct connecting the inlet to the outlet, an inlet valve at one end of the duct for controlling the entry of liquid into the syringe, an outlet valve at the other end of the duct for controlling the outflow of liquid from the syringe, a handle for the syringe extending at right angles to the duct, an elongate member that is wholly within the handle, a chamber in said member which opens into the duct at one end of said member at a location intermediate said inlet valve and said outlet valve and which extends away from the duct at right angles to the duct, a piston mounted in the chamber to slide therein, a piston rod connected to the piston and extending out of the opposite end of said member but lying wholly within said handle, said piston rod being a continuation of said piston with the same shape and size of cross-section so that the piston and piston rod can be pulled out of said opposite end of said member to permit cleaning thereof, two projections on opposite sides of the piston rod, a lever pivoted at a location which is fixed with respect to the handle and having an actuating arm extending alongside said handle, said member, said chamber and said piston, coupling means coupling said lever to said piston rod, for imparting to the piston reciprocatory linear motion in consequence of reciprocatory turning motion of said lever, and spring means for urging the piston to take up a particular position in the chamber, said coupling means comprising two arms each pivotally connected to the lever, each arm having portions defining an opening therein and one of the arms being connected to the piston rod by one of said projections being entered in the opening defined by said portions of said one arm and the other arm being connected to the piston rod by the other of said projections being entered in the opening defined by said portions of the said other arm.

6. A syringe comprising an inlet for the entry of liquid into the syringe, an outlet for the outflow of liquid from the syringe, a duct connecting the inlet to the outlet, an inlet valve at one end of the duct for controlling the entry of liquid into the syringe, an outlet valve at the other end of the duct for controlling the outflow of liquid from the syringe, a handle for the syringe extending transversely to the duct, a chamber within the handle which opens into the duct at a location intermediate said inlet valve and said outlet valve and which extends away from the duct transversely to the duct, a piston mounted in the chamber to slide therein, means for imparting reciprocatory motion to the piston, comprising a piston rod connected to the piston, two projections on opposite sides of the piston rod, a lever pivoted at a location which is fixed with respect to the handle, two arms each pivotally connected to the lever, each arm having portions defining an opening therein and one of the arms being connected to the piston rod by one of said projections being entered in the opening defined by said portions of said one arm and the other arm being connected to the piston rod by the other of said projections being entered in the opening defined by said portions of the said other arm and spring means for urging the piston to take up a particular position in the chamber.

References Cited
UNITED STATES PATENTS

| | | | |
|---|---|---|---|
| 1,627,714 | 5/1927 | Soresi | 128—214 |
| 2,435,647 | 2/1948 | Engseth | 103—215 |
| 2,845,875 | 8/1958 | Corbett | 103—153 |
| 3,061,202 | 10/1962 | Tyler | 239—330 |

FOREIGN PATENTS

| | | |
|---|---|---|
| 112,791 | 3/1941 | Australia. |
| 126,075 | 11/1947 | Australia. |
| 799,413 | 4/1936 | France. |
| 251,254 | 10/1947 | Switzerland. |

DALTON L. TRULUCK, *Primary Examiner.*